US012742720B2

(12) United States Patent
Sukas et al.

(10) Patent No.: US 12,742,720 B2
(45) Date of Patent: Sep. 22, 2026

(54) MICROFLUIDIC DEVICE FOR DETECTING AND CHARACTERIZING AT LEAST ONE ANALYTE, FOR EXAMPLE A CELL, IN A SAMPLE FLUID

(71) Applicant: TECHNISCHE UNIVERSITEIT EINDHOVEN, Eindhoven (NL)

(72) Inventors: Sertan Sukas, Eindhoven (NL); Jacob Marinus Jan Den Toonder, Eindhoven (NL)

(73) Assignee: TECHNISCHE UNIVERSITEIT EINDHOVEN, Eindhoven (NL)

( * ) Notice: Subject to any disclaimer, the term of this patent is extended or adjusted under 35 U.S.C. 154(b) by 167 days.

(21) Appl. No.: 18/729,819

(22) PCT Filed: Jan. 31, 2023

(86) PCT No.: PCT/NL2023/050040
§ 371 (c)(1),
(2) Date: Jul. 17, 2024

(87) PCT Pub. No.: WO2023/146404
PCT Pub. Date: Aug. 3, 2023

(65) Prior Publication Data

US 2025/0102414 A1 Mar. 27, 2025

(30) Foreign Application Priority Data

Jan. 31, 2022 (NL) ..................................... 2030787

(51) Int. Cl.
*G01N 15/12* (2024.01)
*B01L 3/00* (2006.01)
(Continued)

(52) U.S. Cl.
CPC ........ *G01N 15/12* (2013.01); *B01L 3/502715* (2013.01); *G01N 15/1023* (2024.01);
(Continued)

(58) Field of Classification Search
None
See application file for complete search history.

(56) References Cited

U.S. PATENT DOCUMENTS 8,394,249 B2 * 3/2013 Pollack ............... B01L 3/50273 204/600
11,371,988 B2 * 6/2022 Talebpour ......... B01L 3/502715
(Continued)

FOREIGN PATENT DOCUMENTS

| | | | |
|---|---|---|---|
| CN | 110320250 | A | 10/2019 |
| EP | 3418721 | A1 | 12/2018 |
| JP | 2012196189 | A | 10/2012 |

OTHER PUBLICATIONS

European Patent Office, International Search Report and Written Opinion received in International Application No. PCT/NL2023/050040, Apr. 4, 2023, 14 pages.

*Primary Examiner* — Jermele M Hollington
(74) *Attorney, Agent, or Firm* — Suiter Swantz IP

(57) ABSTRACT

A device for detecting at least one analyte, for example a cell, in a sample fluid, the device comprising a fluid channel having a longitudinal channel axis and structured to allow the sample fluid containing at least one analyte to pass through the fluid channel, at least one pair of electrodes, an electric field generating unit for generating an electric field between the at least one pair of electrodes, a detecting unit for detecting the at least one analyte in the sample fluid based on its passage through the electric field, wherein each electrode of the at least one pair of electrodes has a three-dimensionally structured electrode surface, which electrode surface is curved about the longitudinal channel axis. The device may further comprise an optic sensing unit structured to optically sense a sensing region of the fluid channel between the at least one pair of electrodes.

17 Claims, 17 Drawing Sheets

(51) Int. Cl.
*G01N 15/10* (2006.01)
*G01N 15/14* (2024.01)

(52) U.S. Cl.
CPC ...... *G01N 15/1484* (2013.01); *B01L 2200/16* (2013.01); *B01L 2300/0645* (2013.01); *B01L 2300/0654* (2013.01); *B01L 2300/168* (2013.01); *B01L 2400/0622* (2013.01); *G01N 2015/1006* (2013.01); *G01N 2015/1029* (2024.01); *G01N 2015/103* (2024.01); *G01N 2015/135* (2024.01)

(56) References Cited

U.S. PATENT DOCUMENTS

2007/0281288 A1* 12/2007 Belkin ............... G01N 21/6452 435/287.1
2015/0276727 A1* 10/2015 Talebpour .......... G01N 33/5005 435/308.1
2018/0095067 A1* 4/2018 Huff ................. G01N 33/48721
2020/0316603 A1 10/2020 Kashanin et al.
2025/0180456 A1* 6/2025 Sukas .................. G01N 15/149

* cited by examiner (a)
Opacity distributions
count
100
0
8
16
count
400
0
8
16

MICROFLUIDIC DEVICE FOR DETECTING AND CHARACTERIZING AT LEAST ONE ANALYTE, FOR EXAMPLE A CELL, IN A SAMPLE FLUID

TECHNICAL FIELD

The present disclosure relates to a microfluidic device for detecting and characterizing at least one analyte, for example a cell, in a sample fluid.

BACKGROUND OF THE DISCLOSURE

Existing microfluidic devices that employ thin-film electrodes for electrical impedance measurements for analyte (particle or cell) differentiation rely on flat electrodes placed at the bottom side or at the top and bottom sides of the microfluidic channel. Such configurations provide low sensitivity and low signal-to-noise ratio as the analyte to be detected, such as a particle or (blood) cell is either partly covered by the created electric field, which is not homogeneous, causing low sensitivity and the signal quality to be dependent on the position of the particle in the channel or fully covered by a homogeneous electric field, causing high noise levels, which hinders the reliability of detection and characterization of particles.

Accordingly, it is a goal of the present disclosure to provide an improved microfluidic device having a higher sensitivity and improved signal-to-noise ratio.

SUMMARY OF THE DISCLOSURE

According to a first example of the disclosure, a device for detecting at least one analyte, for example a cell, in a sample fluid, the device comprising a fluid channel having a longitudinal channel axis and structured to allow the sample fluid containing at least one analyte to pass through the fluid channel, at least one pair of electrodes, an electric field generating unit for generating an electric field between the at least one pair of electrodes, a detecting unit for detecting the at least one analyte in the sample fluid based on its passage through the electric field, wherein each electrode of the at least one pair of electrodes has a three-dimensionally structured electrode surface, which electrode surface is curved about the longitudinal channel axis.

The curved surface of the electrodes, which envelopes the longitudinal channel axis provides a better sensing coverage of the sensing area of the fluid channel between both electrodes and is positioned near or around the longitudinal channel axis, thereby providing a higher sensitivity and improved signal-to-noise ratio.

According to an example of the disclosure, the curved electrode surface of each electrode of the at least one pair of electrodes has a concave shaped electrode surface. The pair of concave shaped electrodes improve sensitivity, as they partly envelop the sensing area between the electrodes and are positioned near or around the longitudinal channel axis in a three dimensional manner and thus have an increased sensitivity for detecting analytes passing the sensing area of the fluid channel between the electrodes.

The sensitivity of the at least one electrode can be adjusted or improved depending on its detection application, by adjusting the arc length of each concentric oriented electrode. In an example, the arc length is between 10°-135°, for example between 10°-60° and in particular between 10°-90°.

In other examples of the disclosure, the fluid channel has a cross section comprising a circular or an ellipsoid segment.

In a further beneficial, yet not limiting configuration, the electrodes of the at least one pair of electrodes are configured at opposite sides of the fluid channel and are facing each other.

A further improved example of the disclosure comprises an optic sensing unit structured to optically sense a sensing region of the fluid channel between the at least one pair of electrodes. With this example, a highly sensitive microfluidic device according to the disclosure is designed, capable of electrical and optical detection of analytes, such as particles or cells in an electrolyte solution. Multi/plural frequency electrical impedance measurements using the electric field generating unit provides information on dielectric properties of the analytes being detected, as well as for their inner and outer morphology and the size.

The additional optical data obtained with the optic sensing unit provide information on physical properties, such as inner and outer morphology and the size. By combining these electric and optical data sets, the device according to the disclosure can be used as a flow cytometer for classification, enumeration, and extraction of target analytes or target particles in a suspension, such as biological cells in blood. The device according to the disclosure can also be used as a hematology analyzer for blood cell classification and counting. In addition to blood count, detection of rare cell populations circulating in blood for disease diagnosis and prognosis is also possible.

In one embodiment, the optic sensing unit has an optical sensing axis extending perpendicular to the longitudinal channel axis and at a mid-plane of the fluid channel, wherein the optic sensing unit further comprises at least one light detector positioned offset from the mid-plane of the fluid channel.

In an example, the optic sensing unit comprises a waveguide unit, or comprises a laser device or comprises an optical sensor. In an example the optical sensor can be a charge-coupled device (CCD), CMOS device, etc.

The sensitivity of the device according to the disclosure is in particular strongly improved, as the electrodes of the at least one pair of electrodes do not obstruct the optical sensing axis or optical paths for illumination and sensing.

In a further example, the microfluidic device comprises a first substrate and a second substrate, the first and second substrates at least partially forming the fluid channel. In addition, the device may comprise at least one integrated waveguide unit optically coupled to a sensing region of the fluid channel between the at least two electrodes. For example, the at least one waveguide unit may be disposed between the first and the second substrates and/or integrated in the first or second substrate.

Alternatively, the first substrate has a first recess and the second substrate has a second recess, with the first and second recesses forming at least partially the fluid channel. In a beneficial example, the first and second recesses have the same shape and in a further example, the first and second recesses each comprise one of the electrodes placed therein.

In order to achieve an improved sensitivity of the device, the first electrode has substantially the same shape as the second electrode. One or more electrodes can have a surface with a cross section comprising a circular segment, and/or one or more electrodes can have a surface with a cross section comprising an elliptical segment.

In a further example, the detecting unit is structured to detect the at least one analyte in the sample fluid at a voltage drop between the electrodes ranging 0.1 to 0.5 V, preferably, ranging 0.2 V and 0.4 V.

BRIEF DESCRIPTION OF THE DRAWINGS

The disclosure will now be discussed with reference to the drawings, which show in.

DETAILED DESCRIPTION OF THE DISCLOSURE

Figure 1:
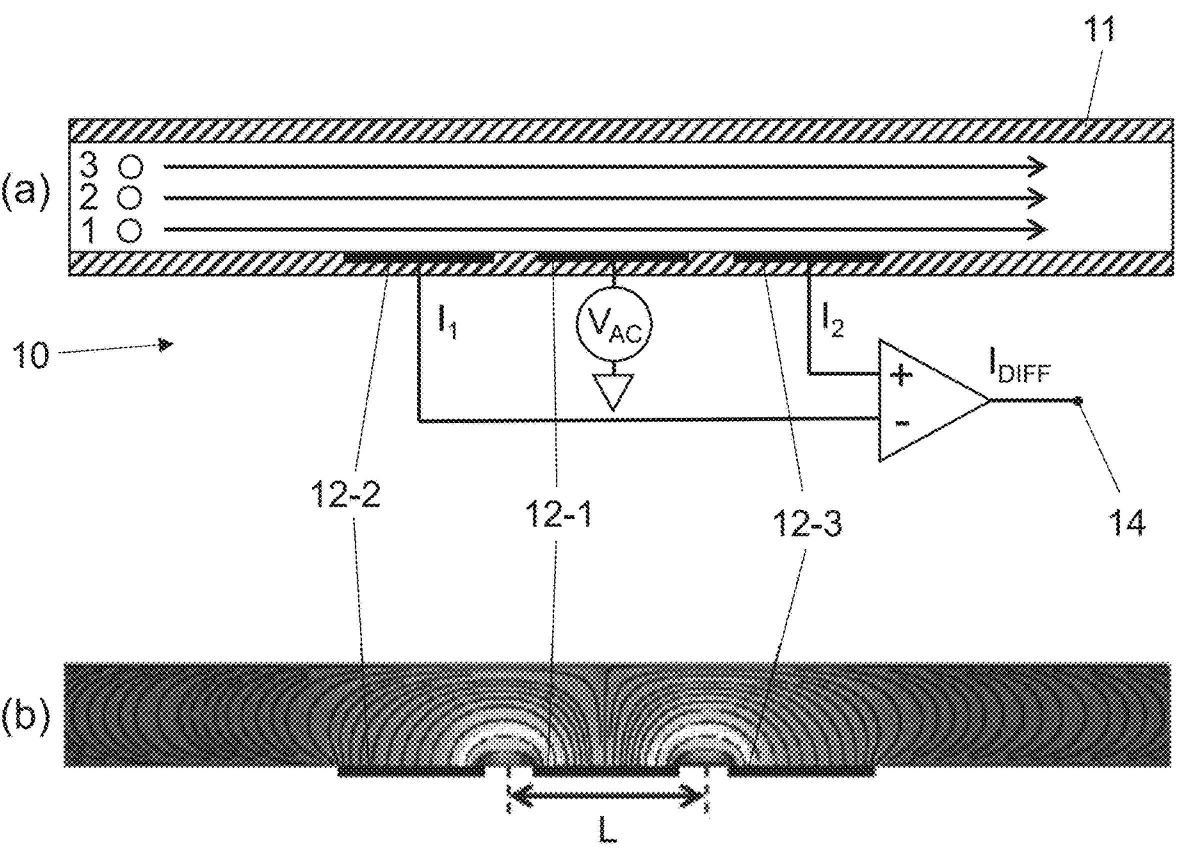
FIGS. 1*a*-1*c* depict an example of a microfluidic device according to the state of the art, implementing a planar electrode layout.
Figure 1:
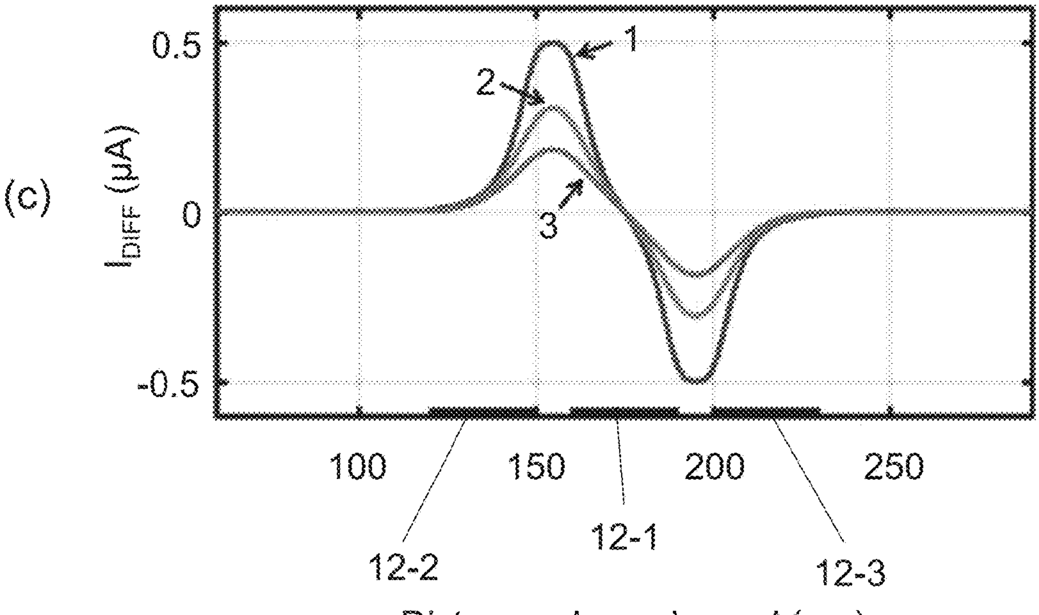

For a proper understanding of the disclosure, in the detailed description below corresponding elements or parts of the disclosure will be denoted with identical reference numerals in the drawings.

The present disclosure provides a microfluidic device with integrated electrodes as a sensor for high sensitivity coupled electrical and optical detection and identification and/or characterization of particles (analytes) in an electrolyte solution. Multi/plural frequency electrical impedance measurements can provide information on dielectric properties of particles (analytes), as well as for their inner and outer morphology and size, shape and/or phenotype. Optical data can provide information on optical (refractive and transmitted) properties for the inner and outer morphology and the size, shape and/or phenotype of the analytes. Combining these rich data sets, the present disclosure can be used as a flow cytometer for detection, identification, enumeration, classification, and characterization of target particles (analytes) in a suspension, such as biological cells in blood.

The present disclosure can also be used as a hematology analyzer for blood cell classification and counting. In addition to blood count, detection of rare cell populations or others secreted from these cells, such as exosomes, circulating in blood for disease diagnosis and prognosis is also possible.

The detection, identification, enumeration, classification, and/or characterization of all types of analytes, such as particles, cells, vesicles, or bacteria require processing them at a single analyte (particle or cell) level, therefore microfluidic tools are required at those length scales. Prior art microfluidic devices that successfully employ electrical impedance measurements for analyte, particle or cell differentiation typically rely on a planar electrode configuration, which configuration has been developed in two known versions.

FIGS. 1*a*-1*c* depict an example of such known microfluidic device 10 according to the state of the art, implementing a planar electrode layout. As depicted in FIG. 1*a*, several planar electrodes 12-1; 12-2; 12-3 are configured or placed at or in the bottom of the channel 11. In this example, three electrodes are placed along to each other seen in the flow direction though the channel 11. An excitation signal 13 is applied to the central electrode 12-1, and the difference in electrical impedance on the side electrodes 12-2 and 12-3 located upstream and downstream from the central electrode 12-1 is measured and outputted via electronic circuitry, which is partly and schematically illustrated with reference numeral 14.

This configuration is easy to manufacture, but it also provides very low sensitivity and signal-to-noise ratio as the particle (depicted with numerals 1, 2 and 3 in FIG. 1*a*) is partly covered by the electric field created within the channel 11, which electric field is not homogeneous. FIG. 1*b* depicts the magnitude of a typical electric field distribution in the channel 11. This non-homogeneous electric field generated by a known configuration of an electric field generating unit (not shown) causes the signal quality to be heavily dependent on the height position of the particle within the channel relative to the planar electrodes 12-1; 12-2; 12-3 placed at or in the bottom of the channel 11.

FIG. 1*c* depicts representative differential signal outputs generated by a particle (numeral 1, 2 or 3) passing through the sensing region in the channel 11 at three different heights. As seen in FIG. 1, a differential layout is applied to use one pair of electrodes as a reference to subtract the drift and noise in the signal to reduce the noise and increase the performance; but the sensitivity never reaches the required levels for any biomedical or analytical applications. Although the manufacturing of this known configuration is simple and cheap, hence suitable for upscaling and industrialization, it has not become an option because of its low performance.

Figure 2:
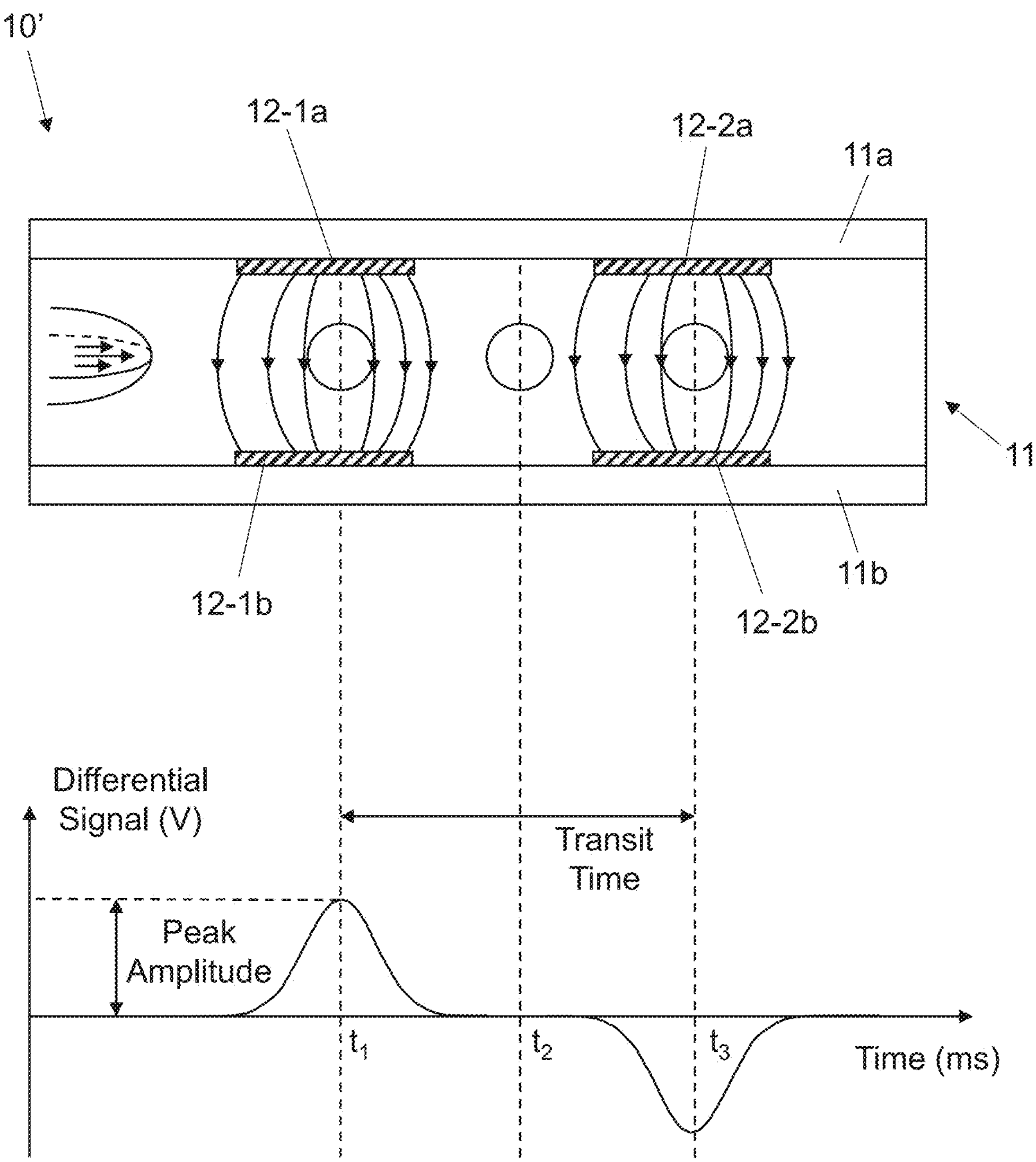
FIG. 2 depicts another example of a microfluidic device according to the state of the art, implementing a parallel facing planar electrode layout.

FIG. 2 shows the higher performance version of the planar electrode layout according to the state of the art, where two parallel pairs of facing electrodes 12-1*a*; 12-1*b* and 12-2*a*; 12-2*b* are configured (mounted or placed) at the top segment 11*a* and the bottom segment 11*b* of the channel 11. This configuration provides a homogeneous electric field distribution, which increases the signal-to-noise ratio and sensitivity. It is the best performing option reported in literature so far and able to provide sensitivities for biomedical applications, such as biological cell detection.

However, the requirement of an intermediate dielectric layer, where top and bottom planar substrate layers are attached onto, prevents upscaling and industrialization of fabrication of such devices. Therefore, this configuration can only be realized in laboratory environment. Besides this issue, another important drawback for this configuration is that the electrodes block the optical access to the measurement volume.

The signal quality is still affected by the position of the particle as it increases when the particle gets closer to either (top or bottom) of the electrodes. However, this is not as dominant as in previous planar electrode case. The noise level of this improved configuration is also too high for accurate measurements, therefore differential measurement approach with double electrode pairs was implemented to further decrease the noise level. However, even then the sensitivity levels only allow successful detection of events at single particle or cell level with limited characterization possibilities.

Figure 3:
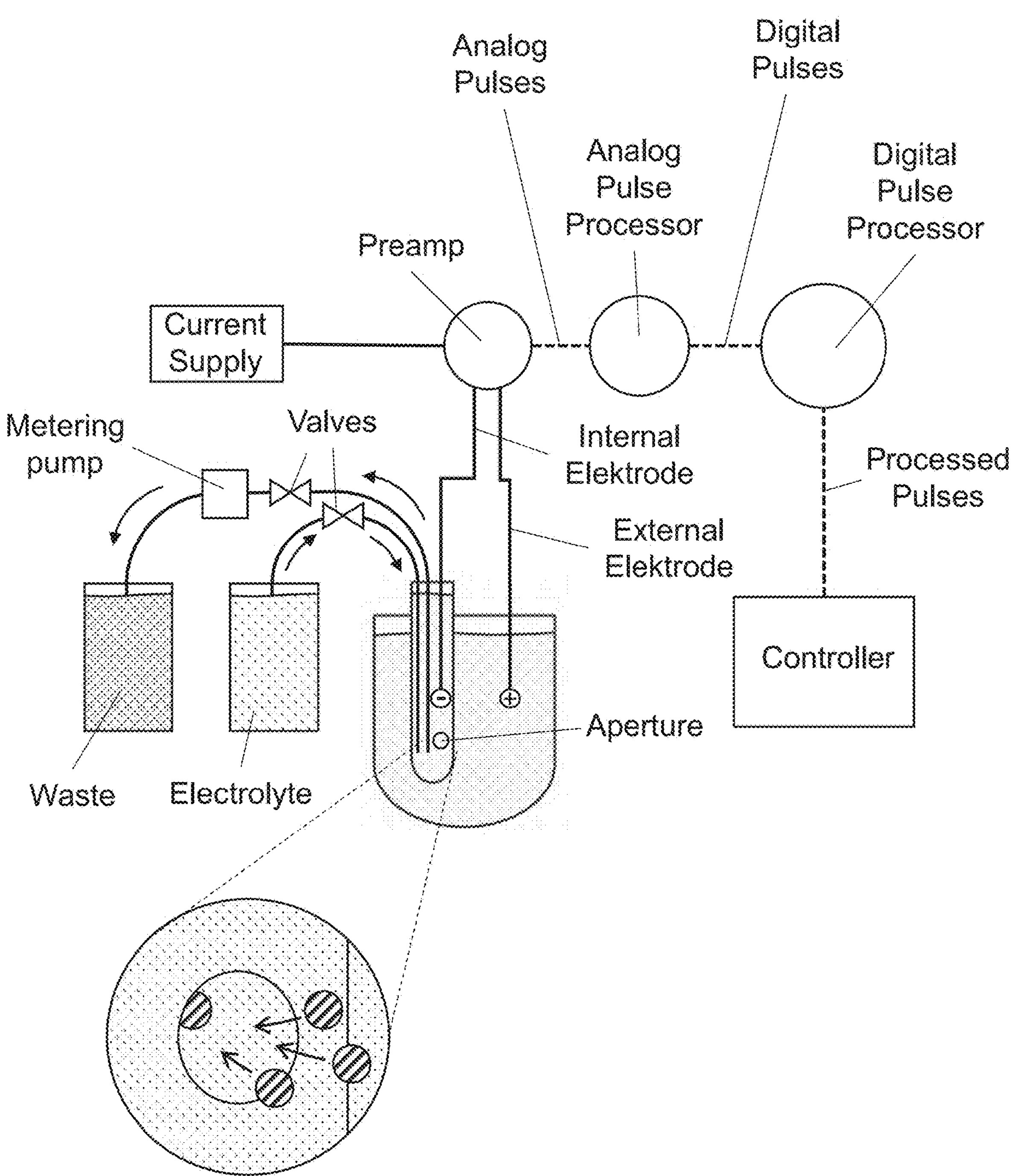
FIG. 3 depict a known schematic application using the Coulter principle in a known hematology analyzer.

The base principle of the measurement approach of the present disclosure is based on the Coulter principle, which is based on counting blood cells by measuring the changes in electrical conductance as cells suspended in a conductive fluid passes through a small orifice. Today, over 98% of automated cell counters (hematology analyzers) incorporate this technology, which is referred to as the "Coulter Principle". FIG. 3 illustrates the working of the Coulter principle in modern hematology analyzers.

Figure 4:
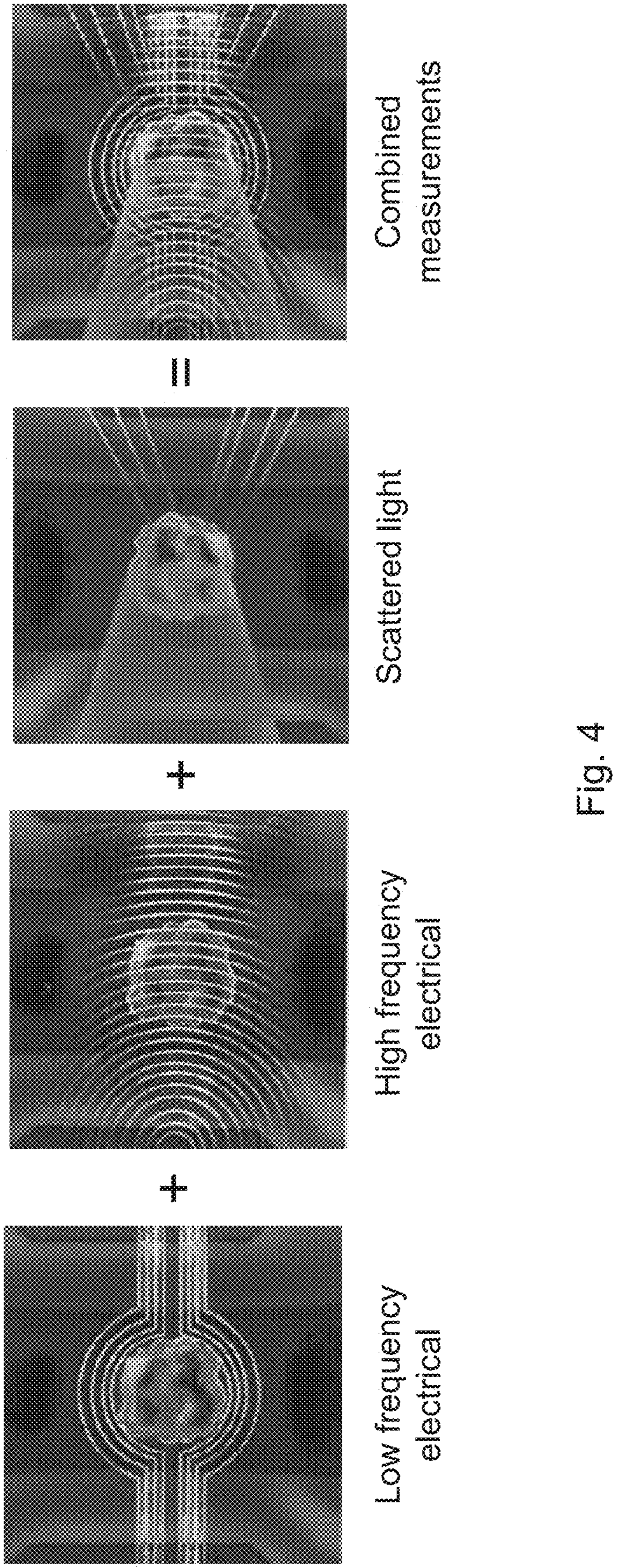
FIG. 4 illustrates of VCS principle for blood cell analysis.

Another variant of this measurement technique was also published more than two decades ago by Coulter, called as Volume, Conductivity, Scatter (VCS) technology as depicted in FIG. 4. Cells are passed through an aperture where an AC voltage is applied through it. Direct current (DC) and radio frequency (RF) impedance measurements are coupled to optical scatter measurements. DC data is used to normalize the RF data to remove the effect of particle position on signal amplitude. Variants of Coulter Principle are used to differentiate and enumerate cell populations in blood, where each population possess very high number of cells (thousands to millions) with the help of post-numerical processes based on statistical guessing as coincidences in measurements, in other words overlapping peaks happen quite often. Hence, this approach lacks the specificity for discriminating rare cell populations in blood.

Prior art flow cytometers are different type of particle analyzers, which are based on optical measurements. Typically, particles are first hydrodynamically focused in a flow stream, then excited with a focused laser light and scattered light in different angles are collected. Particles can also be stained with fluorescent markers for obtaining specific information. Although flow cytometers provide fast and robust analyses, they require around at least 104 particle/cell events for a population to be detected and classified. This makes flow cytometers not possible to use for rare particle/cell populations (less than 10 cells in 1 mL of liquid). Besides, flow cytometers require the particles/cells to be stained with optical biomarkers to be detected within the suspension. Therefore, their performance is always limited to the selected biomarker panel by the user.

Figure 5:
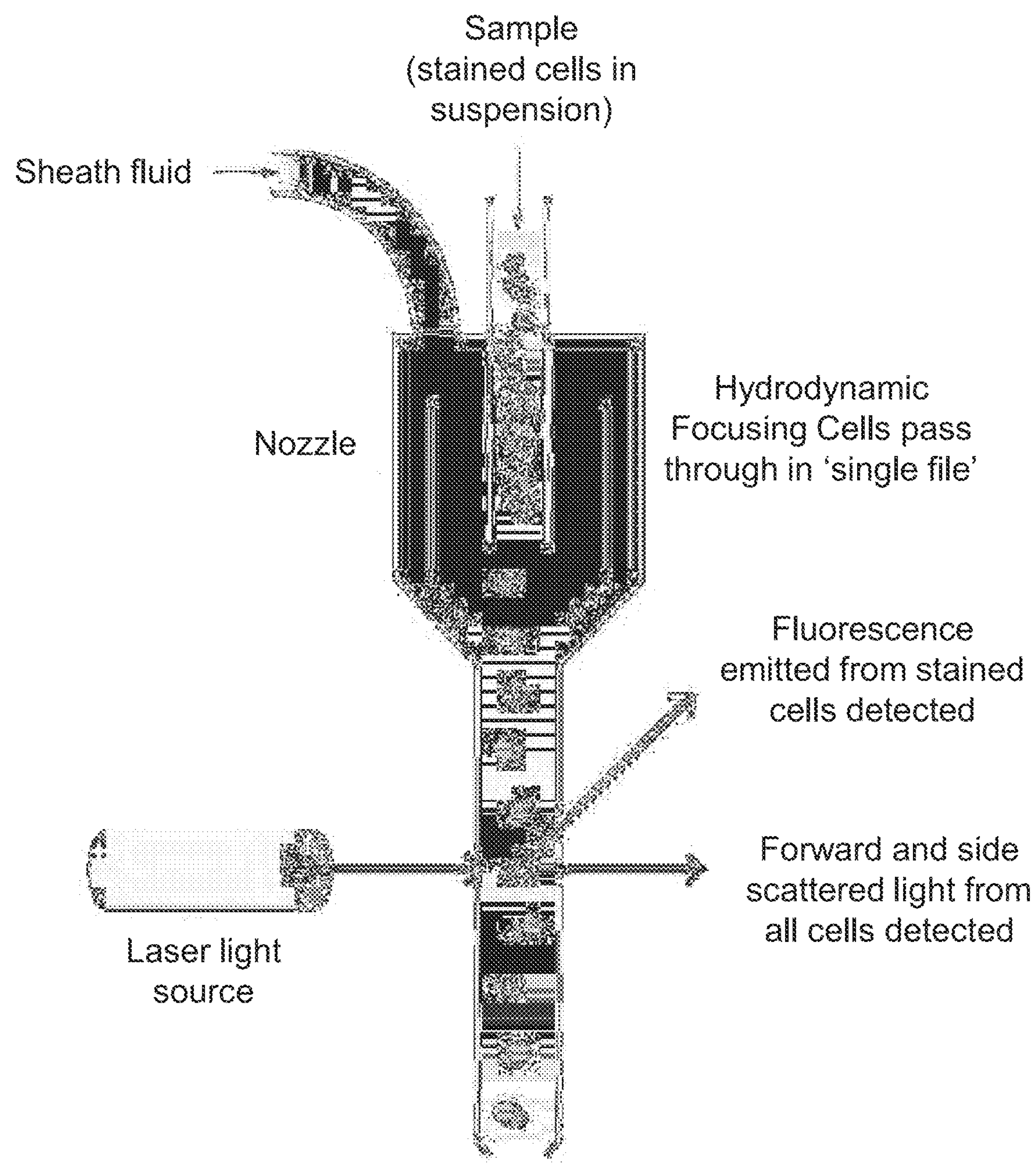
FIG. 5 depicts an example of a flow cytometer working principle according to the state of the art.

FIG. 5 shows the working principle of a known flow cytometer. Flow cytometers are fast and reliable; but very expensive, complex, and bulky systems. Successful application requires laborious sample preparation, trained personnel, use of specific antibodies, which limits its usage for blood analysis.

The present disclosure employs microfluidic technology utilizing a three-dimensional electrode configuration and enabling high sensitivity concurrent electrical and optical measurement of analytes, such as cells/particles. In some embodiments of the present disclosure, this combined measurement approach can be performed in a label-free manner, as well as with using biomarkers to provide data for a specific property set by the user, where multi-frequency electrical impedance measurements provide dielectric properties for the inner and outer morphology, size, shape, and/or phenotype of the analytes, such as cells/particles.

The present disclosure is based on a new microfluidic device design with an improved three-dimensional electrode configuration. This configuration provides high sensitivity and signal-to-noise ratio and can be adjusted to match the desired size range of the particles to further increase the performance.

FIGS. 6 and 7*a*-7*b*-7*c* depict schematic, non-limiting examples of a configuration of a microfluidic device 100 according to the disclosure. The microfluidic devices 100 according to the disclosure allow for multifrequency electrical impedance measurements to be performed on analytes 1, 2, 3 (such as blood cells) passing through a fluid channel 110 having a longitudinal channel axis 110*z* using a pair of three-dimensional curved first and second electrodes 120*a*-120*b*, which are positioned about the longitudinal channel axis 110*z*. As shown in the Figures the first and the second electrodes 120*a*-120*b* have a three-dimensional structured electrode surface positioned about the longitudinal channel axis 110*z*, thereby at least partly enveloping the fluid channel 110.

The microfluidic device 100 may include a first substrate 130*a* and a second substrate 130*b*. Materials suitable for making the one or more substrates 130*a*-130*b* include transparent materials, which are preferably compatible with microfabrication and thin-film processing techniques. Examples may include glass and silica. At least a portion of a wall of the fluid channel 110 may be formed by a first recess 131*a* in the first substrate 130*a*. Additionally or alternatively, at least a portion of the wall of the fluid channel 110 may be formed by a second recess 131*b* in the second substrate 130*b*. Preferably, the first recess 131*a* has the same shape as the second recess 131*b*, which greatly simplifies the manufacturing of the microfluidic devices. Most preferably, the first and second recesses 131*a*-131*b* are symmetric with respect to the mid- or central plane 110*z* of the fluid channel 110.

The electrodes 120*a*-120*b* can be placed facing each other at different, preferably opposite, sides of the fluid channel 110. The first electrode 120*a* may be placed in the recess 131*a* of the first substrate 130*a*, and the second electrode 120*b* may be placed in the recess 131*b* of the second substrate 130*b*. Alternatively, one or more three-dimensional curved electrodes of the present disclosure, such as the electrodes 120*a*-120*b*, may be placed at another chosen location, such that the electrodes face each other and otherwise in accordance with the principles of the present disclosure. Examples of the processes that can be used to place the electrodes include, without limitation, evaporation, sputtering, or direct printing of metals. In the present disclosure, the term "placed" shall be interpreted to include within its meaning any type of depositing, arranging, mounting, integrating, or otherwise providing the one or more electrodes in any other manner consistent with the present disclosure.

Reference numeral 140 schematically depicts a known configuration of an electric field generating unit, which is connected with both electrodes 120*a*-120*b* and which is capable of applying an electric field distribution in the channel 110 between both electrodes 120*a*-120*b*. The electric field distribution in the fluid channel 110 between both electrodes 120*a*-120*b* is shown by the schematic electric field lines 141.

The microfluidic device 100 according to the disclosure may further include an optic sensing unit 150 (see FIG. 6 and FIG. 7C) arranged to optically detect or sense a region of the fluid channel 110 between the at least one pair of the first and second electrodes 120*a* and 120*b*. The optic sensing/detecting unit 150 can be structured as or include an optical waveguide, a laser device, and/or an optical sensor. In another beneficial example, the optical sensor can be a charge-coupled device (CCD), CMOS device, etc. In an embodiment of the present disclosure, optical measurements using an optic sensing unit 150 are performed concurrently, and preferably synchronously, with the electrical measurements, e.g., using electrodes 120*a* and 120*b*. Since the electrodes 120*a*-120*b* are disposed over only a portion of an inner surface wall 110' of the fluid channel 110, they do not obstruct or hinder the optical sensing axis 150*a* of the optic sensing unit 150. Therefore, label-free (LED illumination, multi-focus, or multi-depth arrangement, transmitted or reflected light, lens-free imaging, waveguide integration, PMT integration, etc.) or fluorescent (using specific biomarkers for staining) measurements are possible. In one exemplary microfluidic device 100, the optical sensing axis 150*a* may be perpendicular to the flow direction through the fluid channel 110, but in other exemplary embodiments it can be horizontal. In general, the optical sensing axis 150*a* may form any angle with the direction of the flow through the fluid channel 110 that allows for optical measurements to be made through the portion(s) of the first and or second substrate(s) 130*a* and 130*b* that are not obstructed by the electrode(s) 120*a* and 120*b*.

FIGS. 7*a*-7*b*-7*c* illustrate several side views of the microfluidic device 100 according to the disclosure with the configuration of the pair of first and second electrodes 120*a*-120*b* and electric field lines. The pair of electrodes 120*a*-120*b* face each other from different, preferably opposite sides of the fluid channel 110. The first and the second electrodes 120*a*-120*b* have a three-dimensional structured electrode surface positioned about the longitudinal channel axis 110*z*, thereby at least partly enveloping the fluid channel 110. In some exemplary embodiments, one or more of the electrodes are oriented at least partially concentric with respect to a longitudinal channel axis of the fluid channel 110. In an exemplary embodiment, the electrodes 120*a*-120*b* are three-dimensional curved electrodes and are preferably concave shaped. A concave surface of the first electrode 120*a* preferably faces a concave surface of the second electrode 120*b*. One or more of the three-dimensional curved electrodes may have a surface that is at least partially cylindrically shaped. Preferably, one or more of the electrodes comprises a surface that has at least partially circular or partially elliptical cross-section and/or comprises a segment of a circle or of an ellipse.

The configuration of electrodes according to the present disclosure results in an improved performance compared to the known prior art devices implementing planar electrodes placed at the top-bottom of the channel in parallel facing arrangement as shown in FIG. 2, which has to be fixed for a single depth because of the limitations coming from the fabrication process. This configuration hinders the optical visibility, therefore cannot be coupled to optics for real-time coupling for measurements as in the present disclosure. The examples of the microfluidic device 100 according to the disclosure not only enables optical visibility but also enables fabrication of multi-depth channels on a single chip/device for higher performance.

Figure 6:
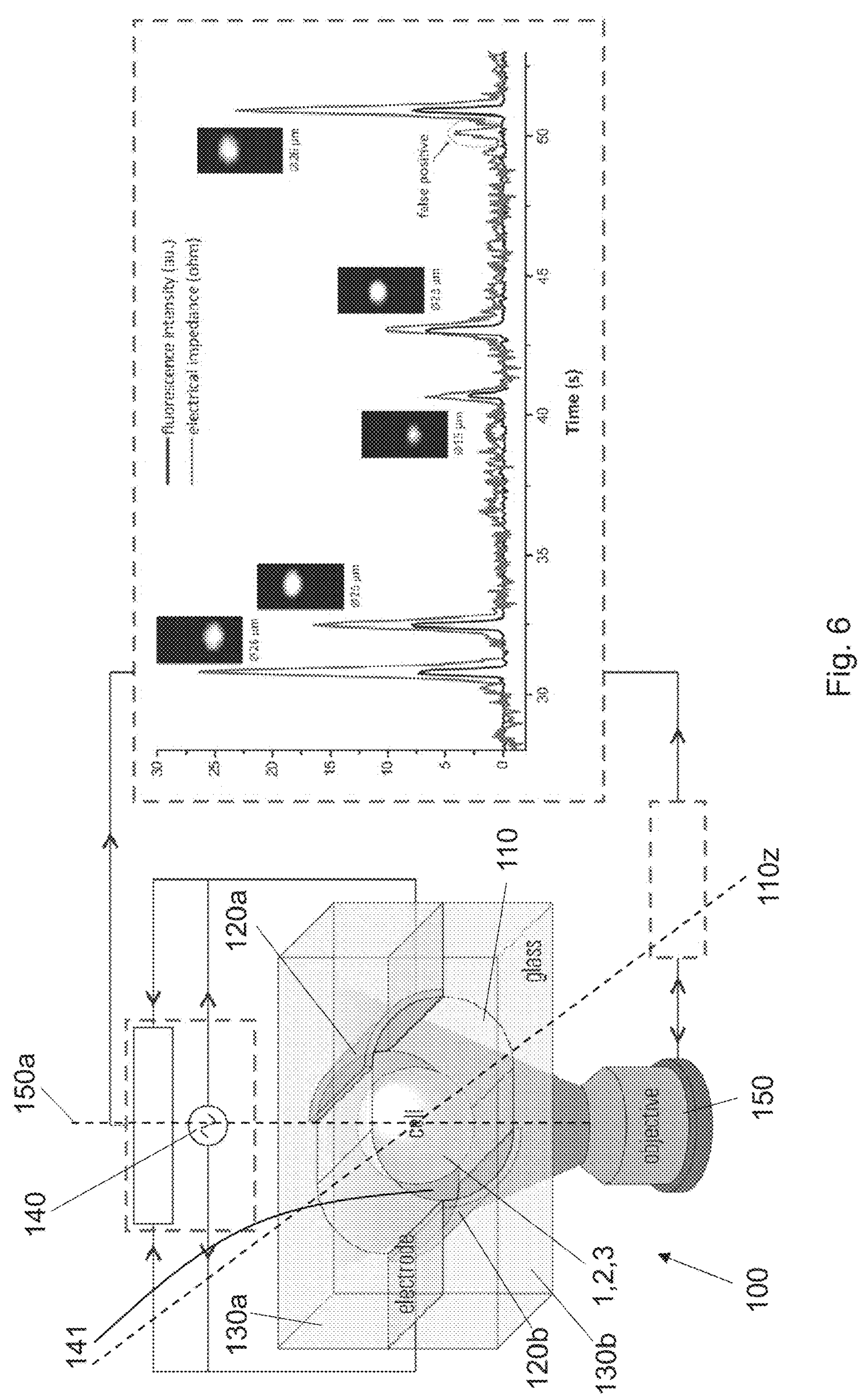
FIG. 6 depicts schematically an example of a microfluidic device according to the disclosure as well as illustration of measurement methodology according to the disclosure.
Figure 7:
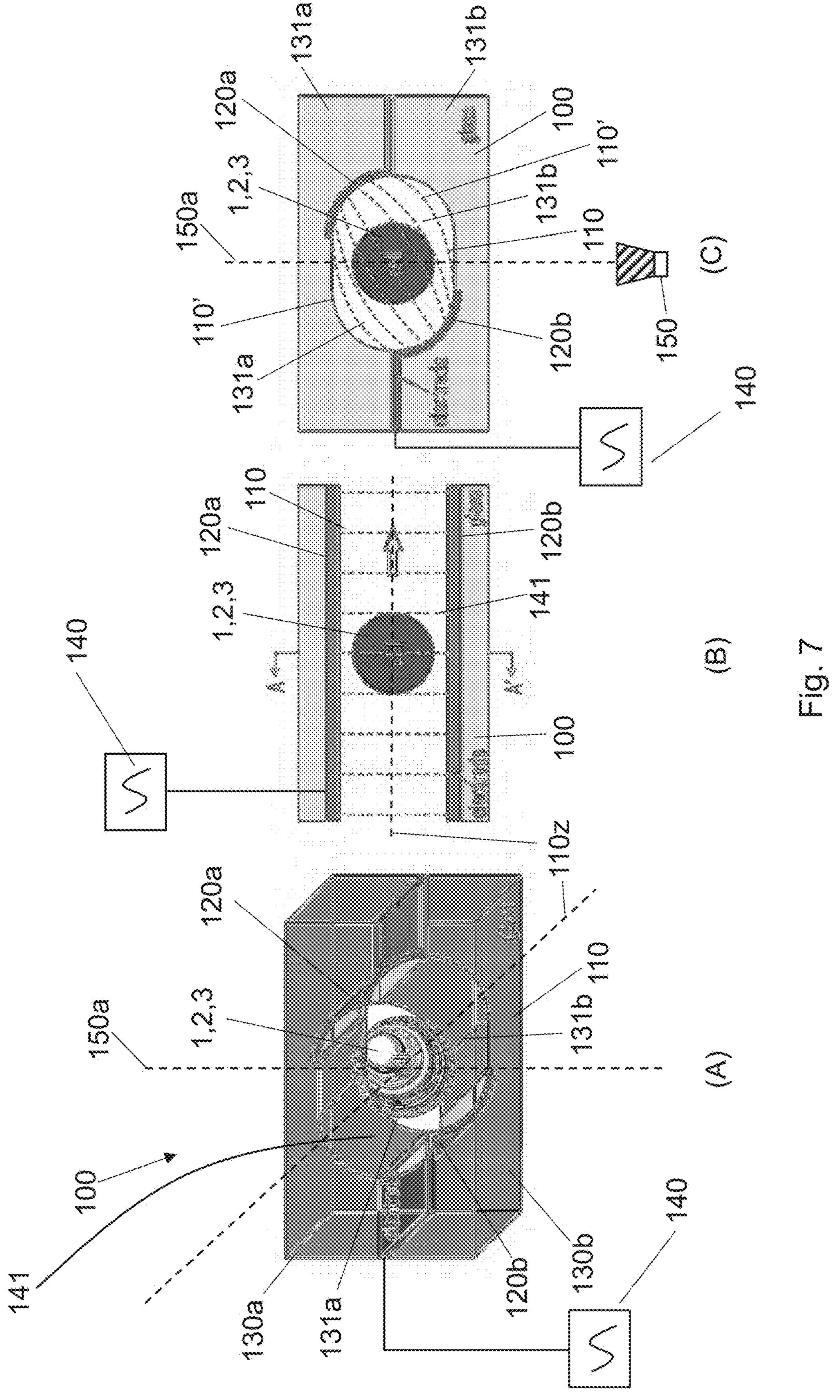
FIG. 7 illustrates further details of the example of FIG. 6.
Figure 8:
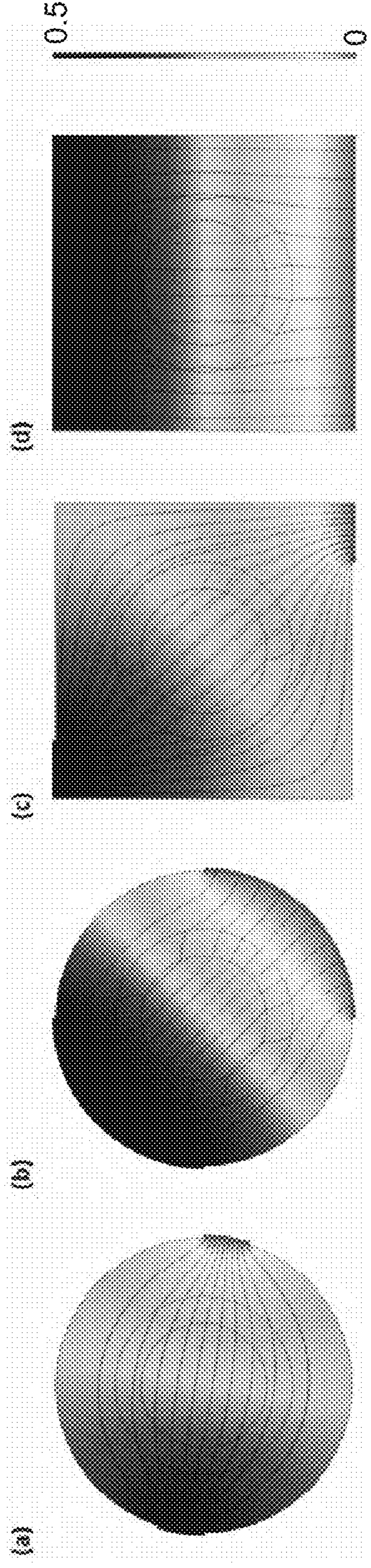
FIGS. 8*a*-8*d* depict representations of electric field distributions belonging to several arrangements of electrode configurations.

Although in the exemplary embodiments shown in FIGS. 6 and 7 the arc length of each electrode 120*a* and 120*b* is about 90°, seen along the curvature of the curved surface of the electrodes 120*a*-120*b*. In other exemplary embodiments electrodes 120*a*-120*b* can be implemented having an arc length between 10°-135°, for example between 10°-60° or between 10°-90°, all seen along the curvature of the curved surface of the electrodes 120*a*-120*b*. As illustrated in FIGS. 6 and 7 the arc length of each electrode 120*a*-120*b* is about 90°. In the examples shown, the fluid channel 110 has an ellipsoid cross section, however a circular cross section is equally feasible. In exemplary embodiments, the fluid channel 110 may have an inner surface wall 110' that is at least partially cylindrically shaped. Preferably, the fluid channel 110 comprises an inner surface wall 110' that has at least partially circular or partially elliptical cross-section and/or comprises a segment of a circle or of an ellipse.

The performance of the microfluidic device according to the disclosure has been compared to the known prior art implementing top-bottom planar electrodes as shown in FIG. 2. A numerical study was performed for determining the frequency dependent response of a cell of 12 μm diameter and nuclear-to-cytoplasm ratio of 0.5 in 1× PBS buffer. The electrical parameters of the cell were typical and extracted from literature. The size of the measurement volume for the top-bottom electrode configuration was a square of 20 μm by 20 μm and for the new three-dimensional concave electrode configuration was a circle of 20 μm diameter. For a fair comparison, the penetration of the electrodes inside the microchannel was set between 10% to 100% and data were compared.

FIGS. 8*a*-8*d* shows the typical configuration and the distribution of the electric field lines, showing a typical arrangement of three-dimensional shaped electrode configurations (10% in FIG. 8*a* and 50% in FIG. 8*b*) of the microfluidic device 100 according to the disclosure and top-bottom (20% in FIG. 8*c* and 100% in FIG. 8*d*) electrode configurations of the prior art (FIG. 2). The legend and the streamlines represent the electric field strength and distribution, respectively.

Figure 9A:
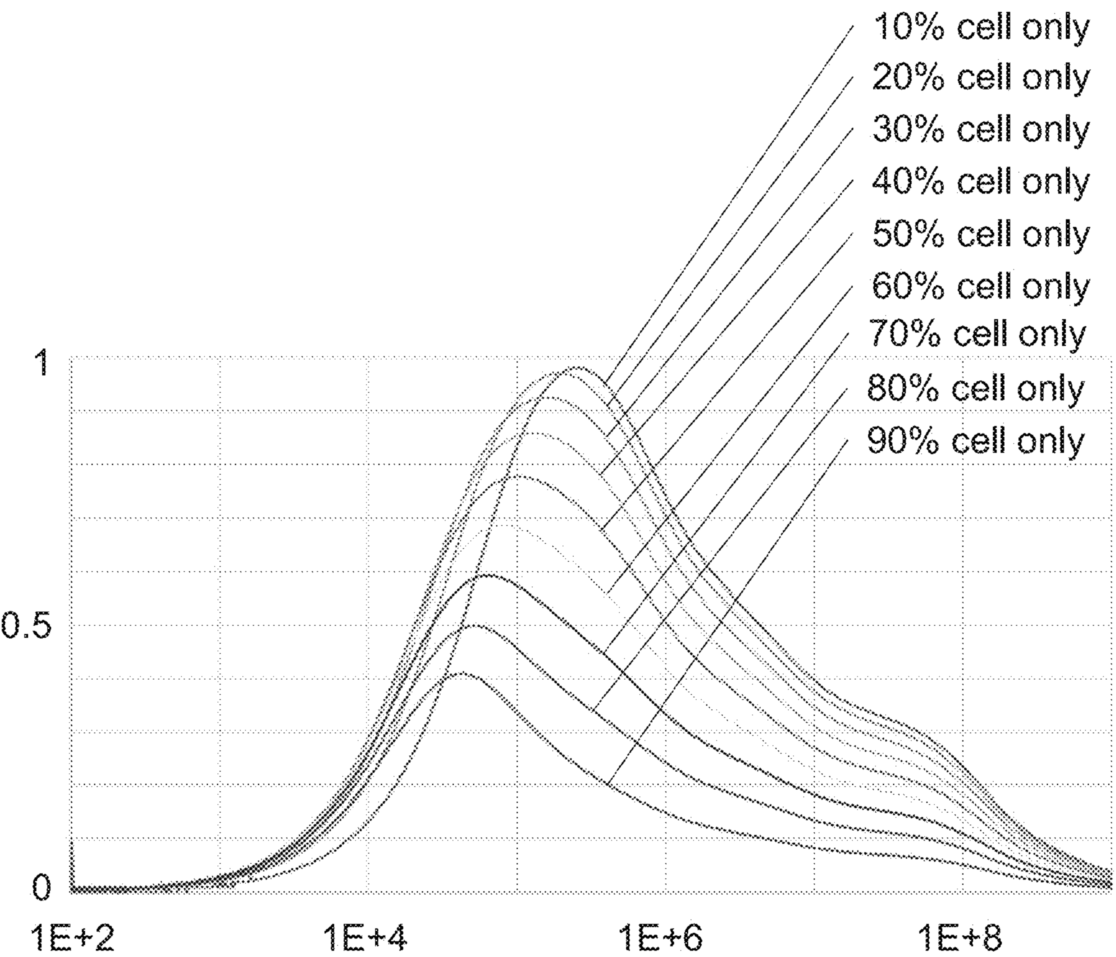
FIGS. 9*a* and 9*b* show the results for extracted electrical impedance signals for the whole cell measurements.
Figure 9B:
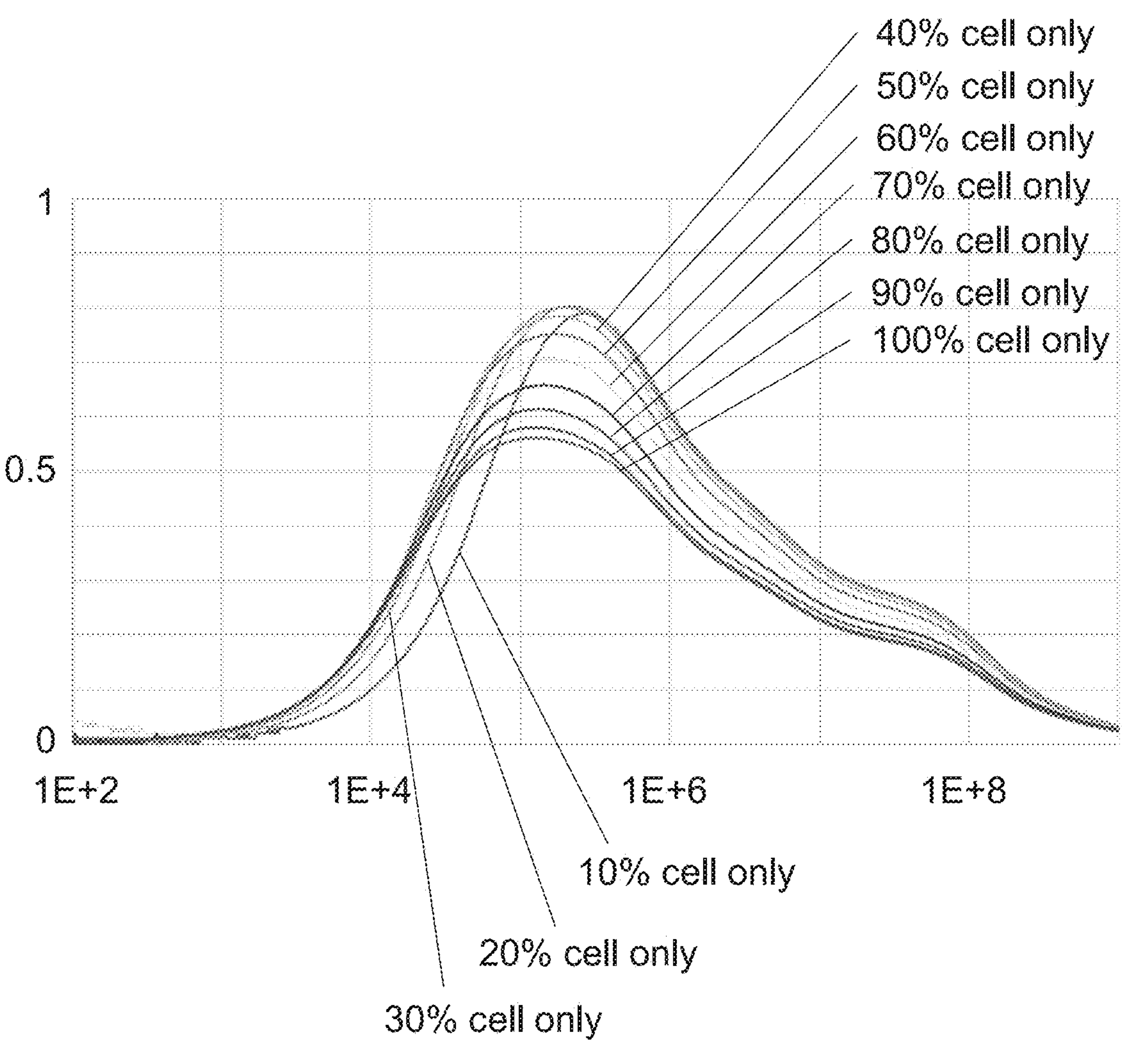

FIGS. 9*a*-9*b* show the results for extracted electrical impedance signals (frequency dependent impedance responses) for the whole cell measurements, for different electrode configurations. FIG. 9*a* pertains to measurements performed with three-dimensional shaped electrode configurations of the microfluidic device 100 according to the disclosure and FIG. 9*b* pertains to measurements performed with top-bottom electrode configurations of the prior art as shown in FIG. 2.

Figure 10A:
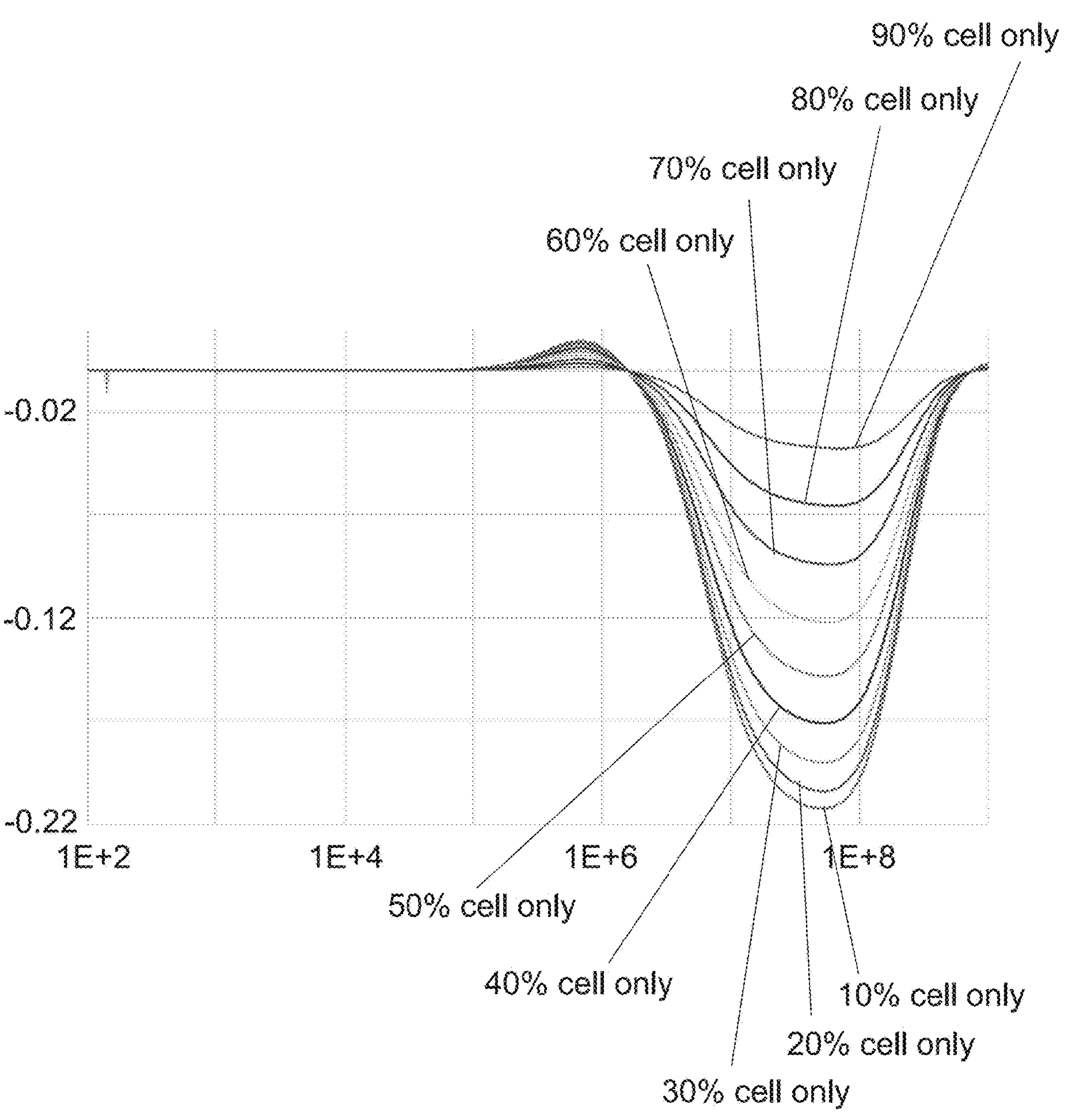
FIGS. 10*a* and 10*b* show the results for extracted electrical impedance signals for the nucleus only measurements.
Figure 10B:
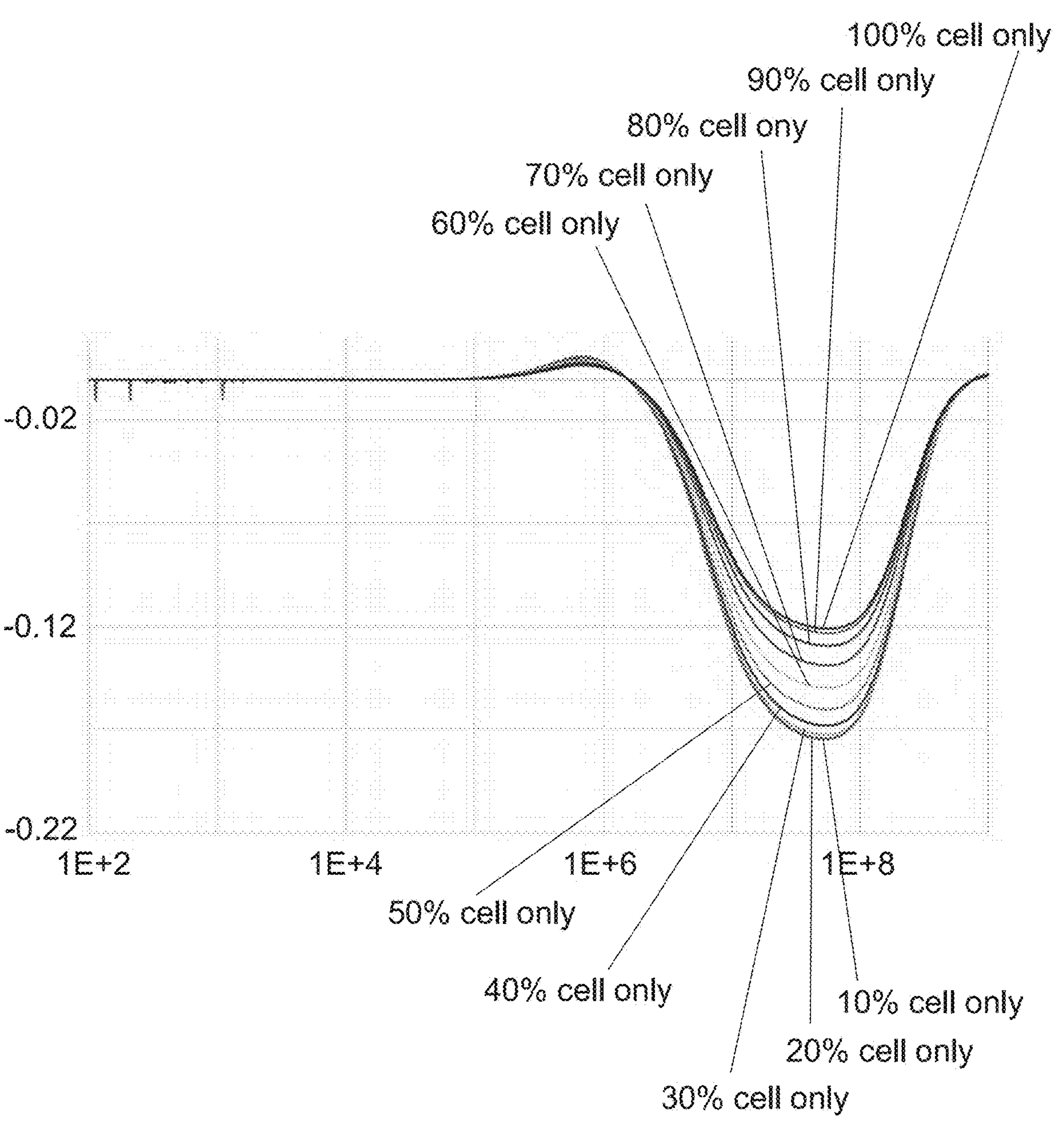

Similarly, FIGS. 10*a* and 10*b* show the results for extracted electrical impedance signals (frequency dependent impedance responses) for the nucleus only measurements. FIG. 10*a* pertains to measurements performed with three-dimensional shaped electrode configurations of the microfluidic device according to the disclosure and FIG. 10*b* pertains to measurements performed with top-bottom electrode configurations of the prior art as shown in FIG. 2.

The examples of microfluidic device according to the disclosure provide higher span for the entire frequency range and typically higher amplitudes compared to the respective prior art configurations. One important characteristic of the new electrode configuration is the possibility for discriminating the inner cell content, e.g. at frequencies lower than 1 MHz, where it is not possible for the top-bottom configuration as the overlapping signals can be visualized in FIG. 10*b*.

Figure 11:
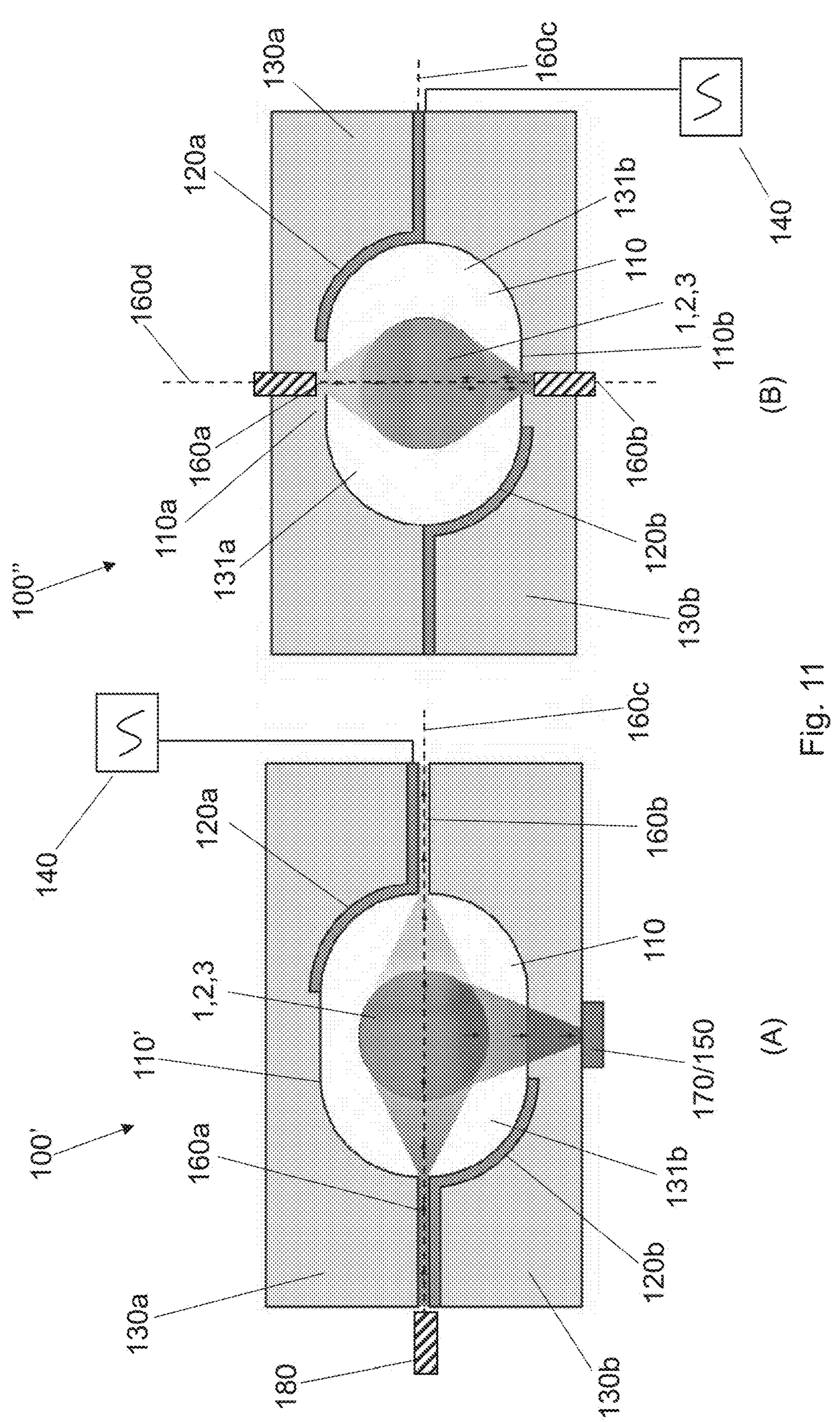
FIGS. 11*a* and 11*b* illustrate another example of a microfluidic device according to the disclosure.

FIGS. 11*a* and 11*b* depict schematically non-limiting examples of other aspects of the microfluidic devices 100' and 100" according to the disclosure. Such exemplary examples comprise integrated optics for more advanced and higher performance applications. At least one integrated waveguide unit, e.g., 160*a*-160*b*, is optically coupled to a sensing region of the fluid channel between at least two electrodes 120*a* and 120*b*. The exemplary microfluidic devices 100'-100" illustrated in FIGS. 11*a* and 11*b* may include a first substrate 130*a* and a second substrate 130*b*. The fluid channel 110 of exemplary embodiments 100' and 100" may be formed, at least partially, by a recess 131*a* in the substrate 130*a* and by a recess 131*b* in the substrate 130*b*.

FIG. 11*a*, depicting example 100', illustrates an exemplary embodiment of the integrated optics utilizing waveguide units 160*a* and 160*b*. One or more waveguide units, e.g., 160*a*-160*b*, may be disposed at or in the intermediate region between the substrates 130*a* and 130*b*, designated schematically by the mid- or center plane 160*c*. In this exemplary embodiment, the waveguide units 160*a*-160*b* are disposed between the first substrate 130*a* and the second substrate 130*b*, preferably, where substrates 130*a* and 130*b* are attached or bonded to each other. The material for the waveguides is selected based on its required difference in refractive index compared to the substrate material relating to the intended application. This difference defines how the light is confined and guided. Waveguide units suitable for use in embodiments of the present disclosure can be created, for example, by depositing/coating the material (e.g. silica or polymeric material) and patterning it on the substrates 130*a* and 130*b* using microfabrication techniques, which are similar to the ones used for manufacturing the substrates. As an alternative to an integrated waveguide unit or units, a focused laser beam from a laser device 180 can be aligned with the plane 160*c* as an external component serving for the same purpose resulting in a lower performance, but simpler and cheaper manufacturing.

FIG. 11*b* illustrates an alternative configuration, denoted with reference numeral 100", where the waveguide units 160*a* and 160*b* may be disposed at the bottom surface 110*b* and the top surface 110*a* of the channel 110, respectively. Waveguide units may be disposed at or in the substrates 130*a* and 130*b*. In one embodiment, the optical axis of one or more waveguide units 160*a* and 160*b* is disposed along a plane 160*d*. The plane 160*d* is oriented at a non-zero angle, and, preferably, generally orthogonally with respect to the mid- or central plane 160*c*. This configuration requires the waveguides to be integrated after forming the recesses 131*a* and 131*b* on the substrates 130*a* and 130*b*.

The manufacturing process and material options can be the same as or similar to those described in connection with the previous configuration, shown in FIGS. 6, 7*a*-7*c* and 11*a*. The material can be deposited onto a template or deposited and then patterned to form the waveguide, which can be disposed on the surface of the fluid channel 110 as the thickness of the waveguide is around two orders of magnitude smaller than the depth of the fluid channel 110. Therefore, the flow path is not disturbed by the waveguide. For shallow channels, where the thickness of the waveguide causes disturbance in the flow field, a recess can be created by removing material from the substrate to obtain a leveled surface for the channel 110 after disposing the waveguides.

As an alternative to integrated waveguides, far field optics can be used for this configuration. The optical components, such as light sources focusing the light and image sensors for collecting and sensing the scattered light can be placed at the top and bottom of the device externally (outside). The waveguide units 160*a* and 160*b* of both examples 100' and 100" of FIGS. 11*a* and 11*b*, are optically coupled to a sensing region of the fluid channel between at least two electrodes 120*a* and 120*b* to provide additional integrated light paths enabling illumination of the analytes 1, 2, 3 (particles or cells) with a (focused) light source and collecting the scattered light in different planes with several angles optionally in combination with a detector 170 for analyzing the analytes. The detector 170 may be located off-set from the light path 160*c* or 160*d* of the waveguide units 160*a*-160*b*. In such embodiments of the present disclosure, the optical axis of the detector forms a non-zero angle with the optical axis of the waveguide. Using external optical components as an alternative or in combination with integrated waveguides can add more functionality to the system and decrease the total cost.

In a first example, illustrated in FIG. 11*a*, light exiting a waveguide 160*a* or a focused (laser) beam 180 placed in the plane 160*c* of the channel 110 illuminating the analytes (cells or particles) 1, 2, 3 creates forward (FSC) and side (SSC) scatter, which can be read, detected, or sensed with an optic sensing/detecting unit 150, including a waveguide 160*b* and a detector 170, respectively. The detector 170 may be located off-set from the light path 160*c* of the waveguide units 160*a* and 160*b*. The detector 170 may be directly attached to the device 100'-100" or placed with a distance based on the requirements of optical sensing application or arrangement of the optical setup or peripheral components.

In a second example, as illustrated in FIG. 11*b*, the waveguide units 160*a* and 160*b* are integrated at the top plane 110*a* and/or bottom plane 110*b* of the channel 110 for illumination and collecting forward and back scattered light. Waveguide unit 160*a* illuminates the analytes 1, 2, 3 and collects back scattered light, while waveguide unit 160*b* collects the forward scattered light. Second option is more suitable for shallow fluid channels 110. In some embodiments of the present disclosure, the first wave guide unit 160*a* and/or a second waveguide unit 160*b* are integrated at a first substrate 130*a* and/or a second substrate 130*b*.

The examples of the microfluidic devices 100, 100' and 100" according to the disclosure implement a three-dimensional curved electrode configuration. The three-dimensional structured electrode surface may be advantageously positioned about the longitudinal channel axis, thereby at least partly enveloping the fluid channel. In some exemplary embodiments, the configuration includes a pair of at least partially concentric oriented electrodes. Some configuration utilize or implement a pair of concave electrodes. Microfluidic devices according to the present disclosure provide higher sensitivity compared to the known prior art devices. Measurements are further improved, with the implementation of the concurrent and preferably synchronous electrical and optical measurements, whereas integration of optical waveguides for creating a hybrid Coulter Principle particle (hematology) analyzer and flow cytometer achieves further improved sensitivity and specificity levels.

With the examples of the microfluidic device 100-100'-100" according to the disclosure high sensitivity and specificity levels can be achieved for electrical measurements for discrimination of analytes, such as normal blood cells, tumor cells and cell clusters, or drug response analysis of tumor cells. The examples of the microfluidic devices according to the disclosure can be used as sensor devices for liquid biopsy, such as rare cell detection in blood, as a hematology analyzer, as a micro-scale flow cytometer, etc.

Figure 12:
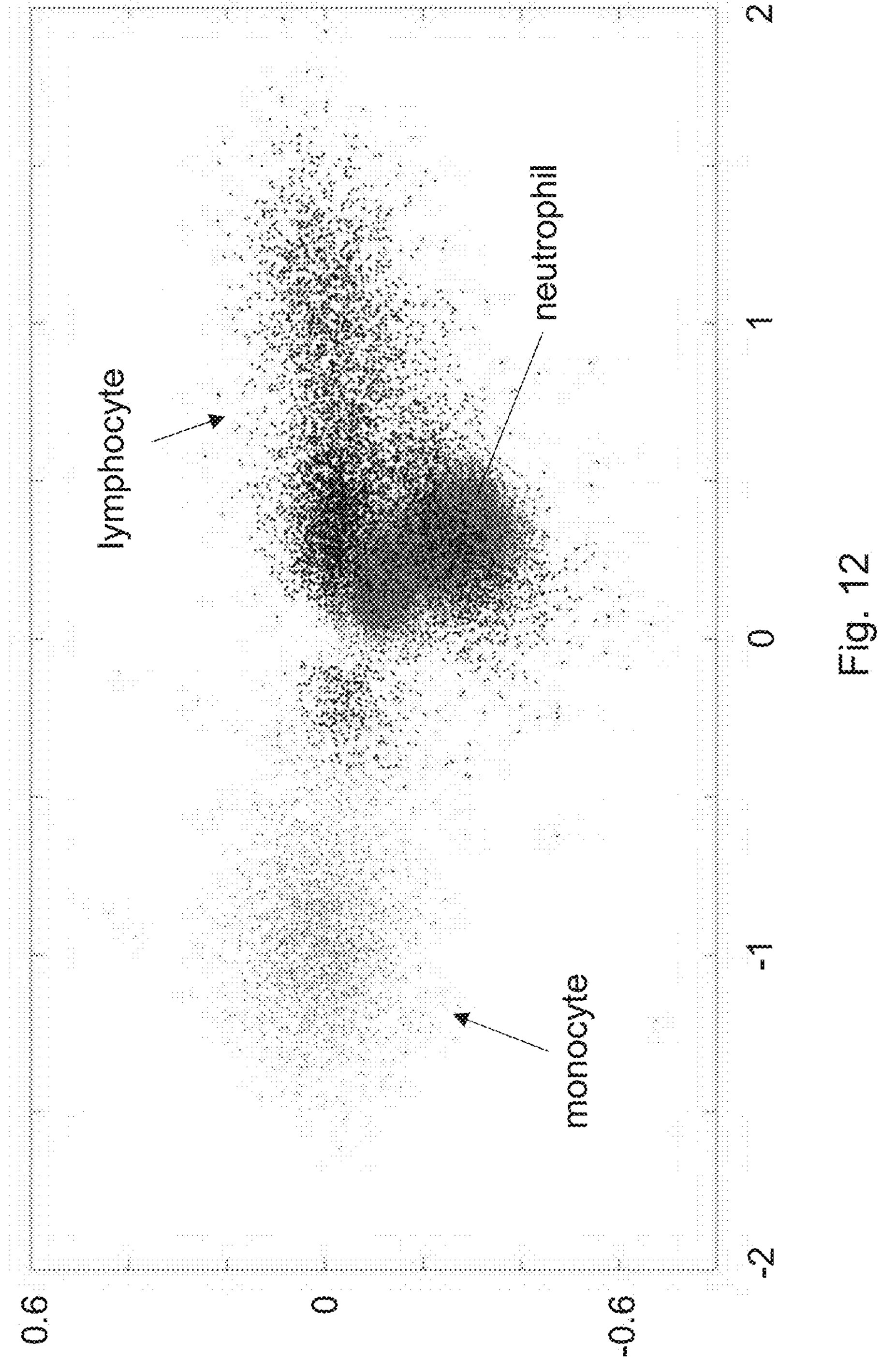
FIG. 12 shows scatter plot of the results of a three-parameter blood count performed by using one of the versions of the device defined in the disclosure.

FIG. 12 represents a 3-parameter blood count performed by using one of the versions of the device defined in the present disclosure. 3 main sub-groups of blood cells, namely neutrophils, lymphocytes, and monocytes were successfully identified with the ratios of 71%, 23%, and 6%, respectively for a healthy, adult donor. The obtained ratios match with the typical blood count for a healthy adult. This measurement was performed using multi/plural frequency electrical impedance measurements on a diluted blood sample (dilution with 1× PBS buffer) without any sample preparation and fully label-free. All measured frequencies were used for defining the cluster of blood cells, where detected cell events for only one frequency was selected for illustration (FIG. 12). Although modern hematology analyzers are able to provide higher level of blood counting, the ability of counting immune cells during a liquid biopsy application would provide additional data for better decision making for the treatment of cancer, as the count of immune cells are relevant to disease progression.

Figure 13:
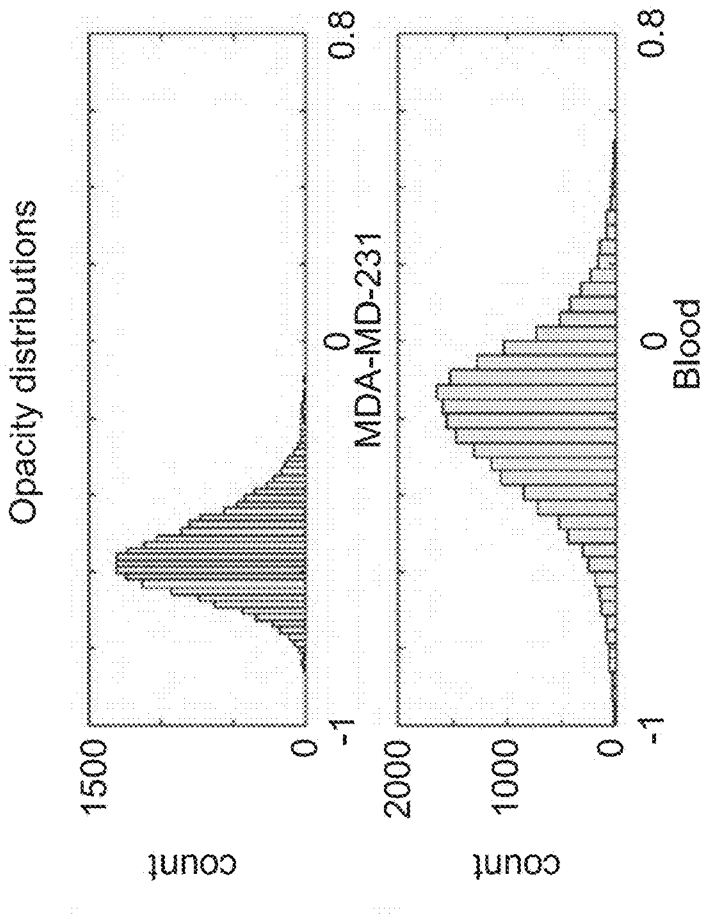
FIG. 13 depicts the difference in the electrical properties (opacity distributions) for breast cancer tumor cell lines (MCF-7 and MDA-MB-231) and blood cells.
Figure 13:
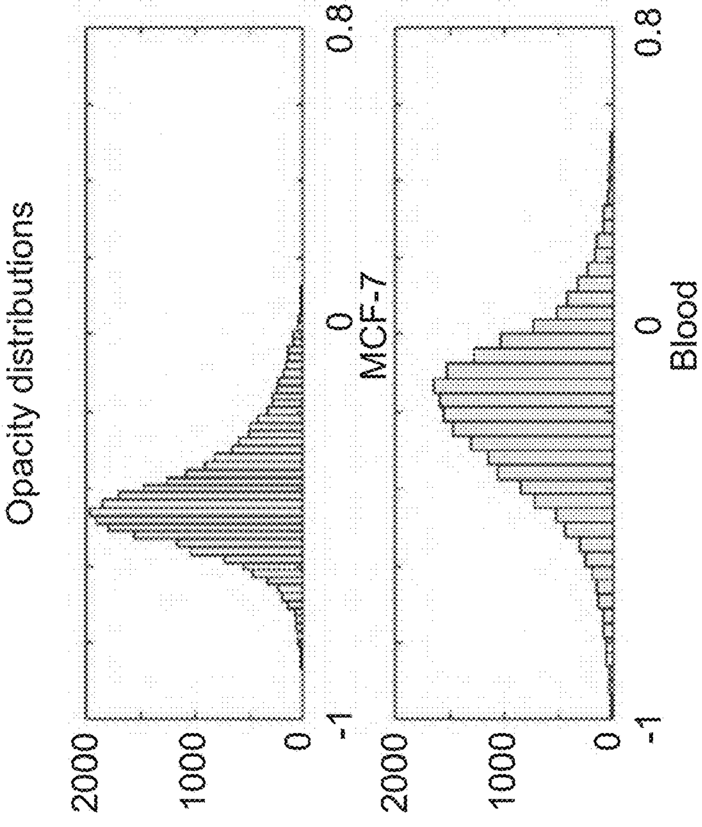

FIG. 13 depicts the histogram plots for the opacity distributions for breast cancer tumor cell lines (MCF-7 and MDA-MB-231) and blood cells. Opacity is defined as the ratio of the high frequency to the low frequency data. These high and low frequency values change depending on the design and the application. In this particular example, it was possible to discriminate the breast cancer tumor cells from the blood cells with high success. Moreover, the difference in the characteristics of MCF-7 cells and MDA-MB-231 cells are also clear. Therefore, it is also possible to discriminate different cell types of the same origin, such as different types of tumor cells of the same cancer type.

The high sensitivity of this system allows studying cell cycles as the amount of nucleic acid content is representative for the state of the cell cycle. Measuring changes in nucleic acid amounts, it is possible to study the efficacy of cancer drugs on tumour cells. This can be performed on a single cell level or culturing the retrieved cancer cells for in vitro or in vivo tumour tissue regeneration.

Figure 14A:
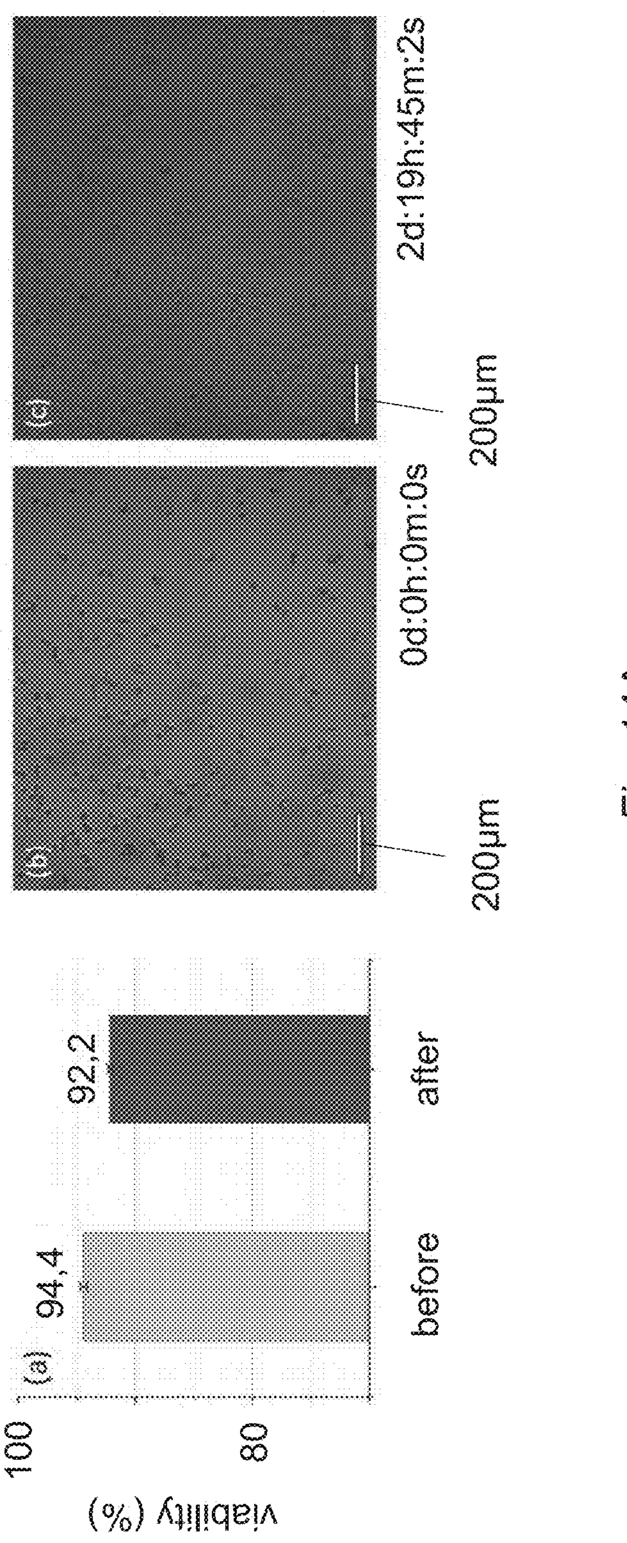
FIGS. 14*a* and 14*b* show the results of a drug response analysis for cells of a breast cancer cell line (MCF-7).

FIGS. **14*a* and 14*b* show the results of a drug response analysis for MCF-7 cells. As a first step, the viability of the cells was measured before and after analyzing these cells using one of the versions of the devices described in the present disclosure. FIG. 14*a*** (*a*) clearly shows that the viability was preserved, and the cells remained intact. To further prove this phenomenon, the cells that were collected after the analysis were cultured for 3 days and they proliferated like healthy cells. FIG. **14*a*** (*b*) shows the image of the well with the cells right after the analysis and **14*a*** (*c*) shows the same well after 3 days of culturing. Then, STS (with 1 μM concentration) were added to this well and the cells were cultured for another 3 days under the exposure of the drug.

Figure 14B:
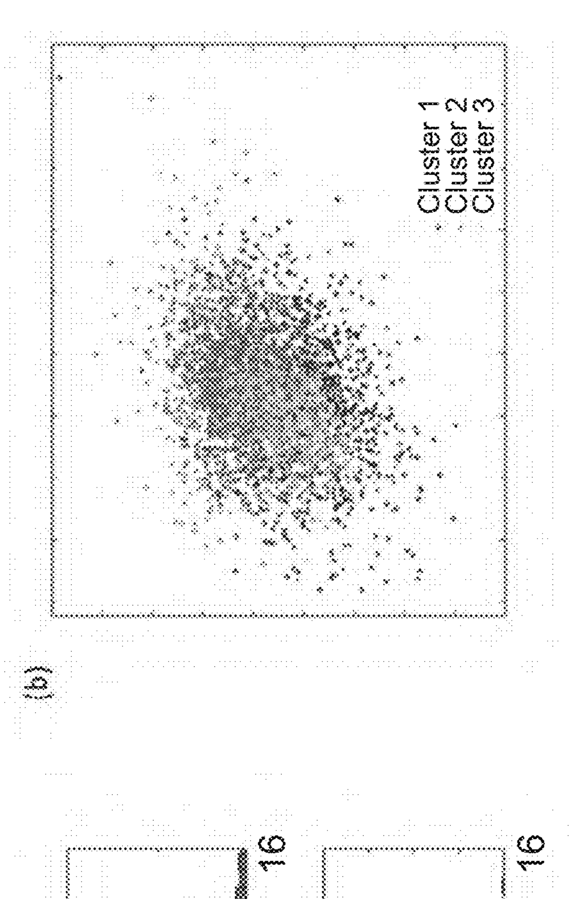

FIG. **14*b* shows the results of the drug response analysis, where the cells were harvested from the well and analyzed using the same device for generating the reference data at the beginning. In parallel, a control sample was also cultured under the same conditions without drug exposure was also analyzed for comparison. FIG. 14*b***(*a*) shows the opacity distribution for control and treated sample for a single frequency and FIG. **14*b***(*b*) shows the 3 clusters within the population. For the control sample, only one cluster, which were viable cells, were identified with 97% ratio for the total number of events. For the treated sample, 3 clusters were identified for viable, early apoptotic, and late apoptotic states with 44%, 19%, and 37% ratios, respectively. For validation, a commercially available apoptosis detection kit for fluorescent imaging were used and it provided the ratios of 47% viable and 53% apoptotic for the treated sample. A high-resolution drug response analysis were performed in a fully label free manner while keeping the cells intact, where the imaging required sample preparation and fixation of the cells, which kills the cells and the possibility of further functional analysis options.

The present disclosure increases the sensitivity and signal-to-noise ratio. Therefore, the required voltage magnitudes to create the excitation and measurement signals are much lower than the state-of-the-art. This is an essential requirement for avoiding electroporation, which is pore formation that is occurring on the plasma membrane of the cell because of the created voltage drop caused by charging the plasma membrane, which acts like a capacitor. In particular, the detecting unit used is structured to detect the at least one analyte in the sample fluid at a voltage drop between the electrodes ranging 0.1 to 0.5 V, preferably, ranging 0.2 V and 0.4 V.

When the voltage drop over the plasma membrane reaches over 0.2 V, pore formation starts for most of the mammalian cells. Pore formation is reversible up to 1-1.5 V and above this threshold, it becomes an irreversible process. Electroporation causes changes in the biological and morphological properties and the integrity of the cells. The reported voltage magnitudes for the defined configurations in FIGS. 1 and 2 typically were around 1.5-2 V for the application and this translates to a voltage drop of minimally between 0.4-1 V. This voltage level is harmful for the biological cells as it is above the electroporation limit for the most of these cells. Providing high sensitivity and low noise, the present disclosure enables successful detection and characterization of cells for voltages below this electroporation limit, hence preserve the viability and keeps the analyzed cells intact (FIG. **14*a***).

Accordingly, embodiments of the present disclosure are capable of achieving measurement results when the electric field generating unit in the embodiments of the present disclosure delivers a voltage drop between electrodes of the present disclosure within the range of 0.1 to 0.5 V and, preferably, within the range of 0.2 to 0.4 V. The results shown in FIGS. 12, 13 and 14 were obtained with voltage values varying between 0.2-0.4 V for frequencies between 1-400 MHz with the maximum reachable voltage drop of 0.12 V, which is below the electroporation limit. For the present disclosure, there are no lower or upper limits for the applicable voltage or frequency. These to be determined based on the sample, used electrolyte (medium conductivity), peripheral electronics (analyzers, power sources, etc.), size of the measurement volume, and the requirements of the analysis.

In addition to being used as a sensor, some embodiments of the present disclosure can be used for electrical treatment and manipulation of cells and particles in suspension. The ability of controlling the electrode area that is in contact with the electrolyte by defining the coverage angle of the concave electrodes provides high level of control on the parameters that are applied for electrical treatment and manipulation. Treatment of particles or cells can be but is not limited to electroporation of cells for content delivery or extraction of inner cell content after e.g. bioproduction. Pore formation during electroporation can be reversible or irreversible as this process (electrode area, applied voltage, etc.) is well controlled and efficient with the proposed configuration.

Manipulation of particles or cells can be but is not limited to guiding them by creating dielectrophoretic forces on these particles/cells. These forces can be generated by targeting a specific property, such as size, morphology, or phenotype, and by adjusting the frequency and the amplitude of the excitation voltage based on the selected property. Dielectrophoretic force then can be used to steer or direct the particles or cells in flow, or collect/concentrate them on defined areas in the device for follow-up downstream analyses.

The invention claimed is:

1. A device for detecting at least one analyte in a sample fluid, the device comprising:

a fluid channel having a longitudinal channel axis and structured to allow the sample fluid containing at least one analyte to pass through the fluid channel;

at least one pair of electrodes;

an electric field generator for generating an electric field between the at least one pair of electrodes;

a detector for detecting the at least one analyte in the sample fluid based on passage through the electric field;

wherein each electrode of the at least one pair of electrodes has a three-dimensionally structured electrode surface that is curved about the longitudinal channel axis; and wherein the device comprises a first substrate and a second substrate, the first substrate having a first recess with one electrode of the at least one pair of electrodes placed therein, and the second substrate having a second recess with another electrode of the at least one pair of electrodes placed therein, the first and the second recesses at least partially forming the fluid channel.

2. The device according to claim 1, wherein the curved electrode surface of each electrode of the at least one pair of electrodes has a concave shaped electrode surface.

3. The device according to claim 1, wherein the at least one pair of electrodes has an arc length between 10° and 135°.

4. The device according to claim 1, wherein the fluid channel has a cross section comprising a circular segment.

5. The device according to claim 1, wherein the fluid channel has a cross section comprising an ellipsoid segment.

6. The device according to claim 1, further comprising an optic sensing unit configured to optically sense a sensing region of the fluid channel between the at least one pair of electrodes.

7. The device according to claim 6, wherein the optic sensing unit has an optical sensing axis extending perpendicular to the longitudinal channel axis and at a mid-plane of the fluid channel.

8. The device according to claim 7, wherein the optic sensing unit further comprises at least one light detector positioned offset from the mid-plane of the fluid channel.

9. The device according to claim 6, wherein the optic sensing unit comprises a waveguide unit.

10. The device according to claim 6, wherein the optic sensing unit comprises a laser device.

11. The device according to claim 6, wherein the at least one pair of electrodes does not obstruct optical paths of the optic sensing unit in terms of illumination and sensing.

12. The device according to claim 1, further comprising at least one integrated waveguide unit optically coupled to a sensing region of the fluid channel between the at least one pair of electrodes.

13. The device according to claim 12, wherein at least one waveguide unit is disposed between the first and the second substrates and/or integrated in the first or second substrate.

14. The device according to claim 1, wherein the first and second recesses have the same shape.

15. The device according to claim 1, wherein each electrode of the at least one pair of electrodes has the same shape.

16. The device according to claim 1, wherein at least one electrode of the at least one pair of electrodes has a surface having a cross section comprising a circular segment or an elliptical segment.

17. The device according to claim 1, wherein the detector is configured to detect the at least one analyte in the sample fluid at a voltage drop between the at least one pair of electrodes ranging from 0.1 to 0.5 V.

* * * * *